United States Patent
Sonner et al.

(10) Patent No.: US 9,616,526 B2
(45) Date of Patent: Apr. 11, 2017

(54) METHOD AND DEVICE FOR CONTROLLING AN AUXILIARY TOOL AXIS OF A TOOL BEING GUIDED BY A MANIPULATOR

(75) Inventors: Christian Sonner, Munchen (DE); Gunther Wiedemann, Gersthofen (DE)

(73) Assignee: KUKA Roboter GmbH, Augsburg (DE)

( * ) Notice: Subject to any disclaimer, the term of this patent is extended or adjusted under 35 U.S.C. 154(b) by 1301 days.

(21) Appl. No.: 12/787,625

(22) Filed: May 26, 2010

(65) Prior Publication Data

US 2010/0305757 A1 Dec. 2, 2010

(30) Foreign Application Priority Data

May 29, 2009 (DE) ................ 10 2009 023 297

(51) Int. Cl.
*B25J 9/12* (2006.01)
*B23K 26/08* (2014.01)
*B23K 26/02* (2014.01)
*B23K 26/04* (2014.01)
*B23K 26/20* (2014.01)
*B23K 26/38* (2014.01)
*B23K 26/082* (2014.01)

(52) U.S. Cl.
CPC .......... *B23K 26/0884* (2013.01); *B23K 26/02* (2013.01); *B23K 26/04* (2013.01); *B23K 26/082* (2015.10); *B23K 26/20* (2013.01); *B23K 26/38* (2013.01)

(58) Field of Classification Search
CPC ............... B25J 9/1674; G05B 2219/39; G05B 2219/39001; G05B 2219/40416; G05B 2219/40541

USPC ......... 700/97, 160, 166, 169, 192–193, 245, 700/250, 262; 356/318, 320, 321, 459, 356/FOR. 112; 29/27 C, 27 R; 82/1.11; 219/121.63, 121.78; 228/103; 318/569; 901/6, 14, 16, 23, 29, 42, 46
See application file for complete search history.

(56) References Cited

U.S. PATENT DOCUMENTS

| | | | | |
|---|---|---|---|---|
| 5,528,698 A | * | 6/1996 | Kamei | B60N 2/002 250/227.15 |
| 5,739,746 A | * | 4/1998 | Shaffer | B60N 2/002 340/425.5 |
| 5,768,137 A | * | 6/1998 | Polidoro | G05B 19/182 382/152 |
| 5,890,085 A | * | 3/1999 | Corrado | B60N 2/002 180/271 |

(Continued)

FOREIGN PATENT DOCUMENTS

| | | |
|---|---|---|
| DE | 101 11 662 A1 | 9/2002 |
| DE | 102 55 037 A1 | 6/2004 |

(Continued)

*Primary Examiner* — Atul Trivedi
(74) *Attorney, Agent, or Firm* — Wood Herron & Evans LLP

(57) ABSTRACT

According to a method according to the invention for operating an additional tool axis (Z) of a tool (2) guided by a manipulator, in particular a robot (1), a position and/or an orientation of the tool in space are defined by axis positions (q1-q6) of the manipulator axes and a position value (f) of the tool axis, are saved and/or displayed, with an automatic conversion being carried out between the position value (f) and an axis position (e) of the tool axis which brings it about.

11 Claims, 1 Drawing Sheet

(56) References Cited

U.S. PATENT DOCUMENTS

Figure 1:
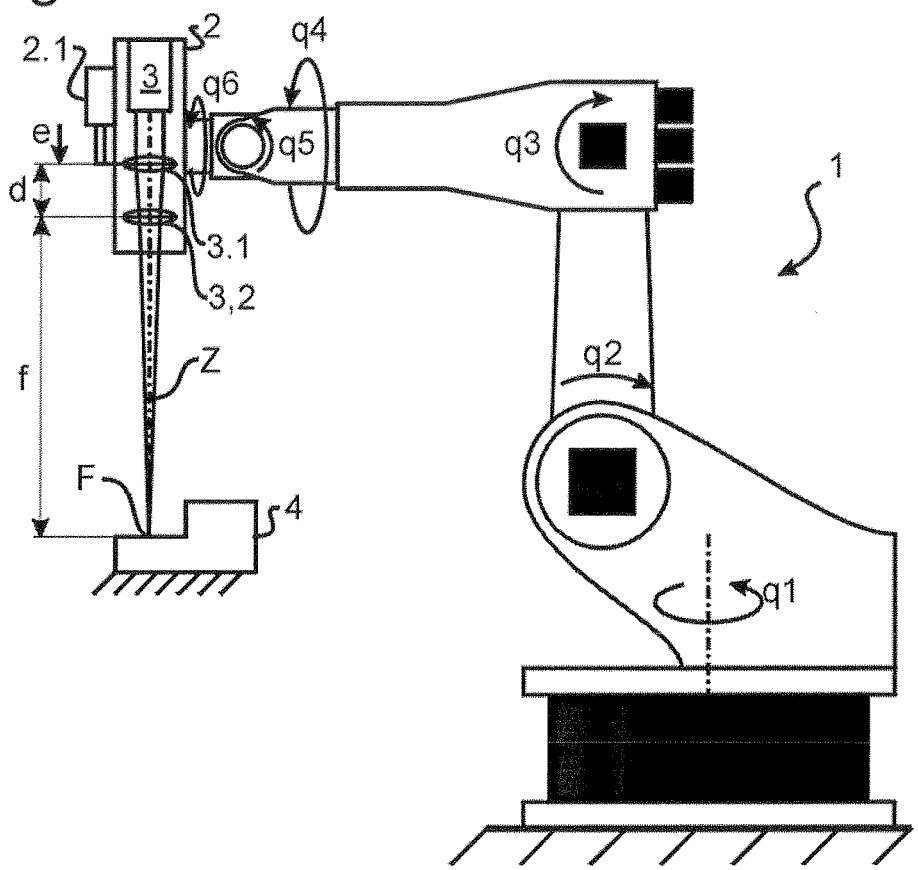

| | | | |
|---|---|---|---|
| 5,925,268 A * | 7/1999 | Britnell | 219/121.63 |
| 6,026,340 A * | 2/2000 | Corrado | B60N 2/002 |
| | | | 280/735 |
| 6,782,316 B2 * | 8/2004 | Breed | B60N 2/002 |
| | | | 180/273 |
| 6,787,729 B2 | 9/2004 | Dugas et al. | |
| 7,292,910 B2 | 11/2007 | Gmeiner | |
| 7,696,452 B2 | 4/2010 | Rippl et al. | |
| 7,779,956 B2 * | 8/2010 | Breed | B60J 10/00 |
| | | | 177/136 |
| 8,168,919 B2 * | 5/2012 | Hamaguchi | B23K 26/04 |
| | | | 219/121.63 |
| 8,412,371 B2 * | 4/2013 | Komatsu | B23K 26/04 |
| | | | 219/121.63 |
| 2002/0036617 A1 * | 3/2002 | Pryor | G06F 3/042 |
| | | | 345/156 |
| 2002/0125231 A1 * | 9/2002 | Hunter | B23K 26/04 |
| | | | 219/121.69 |
| 2003/0009270 A1 * | 1/2003 | Breed | B60C 11/24 |
| | | | 701/32.4 |
| 2003/0204290 A1 * | 10/2003 | Sadler | B60R 25/04 |
| | | | 701/1 |
| 2003/0209893 A1 * | 11/2003 | Breed | B60J 10/00 |
| | | | 280/735 |
| 2004/0010328 A1 * | 1/2004 | Carson | G06Q 10/00 |
| | | | 700/90 |
| 2004/0031779 A1 * | 2/2004 | Cahill | B23K 26/04 |
| | | | 219/121.83 |
| 2004/0046736 A1 * | 3/2004 | Pryor | A63F 13/02 |
| | | | 345/156 |
| 2004/0106916 A1 * | 6/2004 | Quaid | A61B 34/20 |
| | | | 606/1 |
| 2004/0185842 A1 * | 9/2004 | Spaur | B60R 25/04 |
| | | | 455/420 |
| 2005/0102063 A1 * | 5/2005 | Bierre | G01C 15/002 |
| | | | 700/247 |
| 2005/0150876 A1 * | 7/2005 | Menin | B23K 26/0884 |
| | | | 219/121.63 |
| 2006/0047386 A1 * | 3/2006 | Kanevsky | B60K 35/00 |
| | | | 701/36 |
| 2006/0167595 A1 * | 7/2006 | Breed | B60R 21/0152 |
| | | | 701/1 |
| 2006/0208169 A1 * | 9/2006 | Breed | B60N 2/002 |
| | | | 250/221 |
| 2006/0217864 A1 * | 9/2006 | Johnson | B60N 2/002 |
| | | | 701/45 |
| 2006/0251293 A1 * | 11/2006 | Piirainen | B60N 2/002 |
| | | | 382/104 |
| 2007/0037332 A1 * | 2/2007 | Tanaka | 438/166 |
| 2007/0075055 A1 * | 4/2007 | Komatsu | 219/121.63 |
| 2007/0096445 A1 * | 5/2007 | Breed | B60N 2/002 |
| | | | 280/735 |
| 2007/0116327 A1 * | 5/2007 | Breed | B60N 2/002 |
| | | | 382/100 |
| 2007/0135982 A1 * | 6/2007 | Breed | B60J 10/00 |
| | | | 701/36 |
| 2007/0262574 A1 * | 11/2007 | Breed | B60R 1/00 |
| | | | 280/735 |
| 2007/0278194 A1 | 12/2007 | Hoelsher et al. | |
| 2008/0035619 A1 * | 2/2008 | Hamaguchi et al. | 219/121.79 |
| 2008/0036185 A1 * | 2/2008 | Breed | B60N 2/002 |
| | | | 280/734 |
| 2008/0046200 A1 * | 2/2008 | Breed | B60N 2/002 |
| | | | 702/41 |
| 2008/0047770 A1 * | 2/2008 | Breed | B60T 7/06 |
| | | | 180/273 |
| 2008/0069403 A1 * | 3/2008 | Breed | B60K 28/066 |
| | | | 382/104 |
| 2008/0143085 A1 * | 6/2008 | Breed | B60R 21/01516 |
| | | | 280/735 |
| 2008/0148374 A1 * | 6/2008 | Spaur | B60R 25/04 |
| | | | 726/6 |
| 2008/0161964 A1 | 7/2008 | Irie et al. | |
| 2008/0189053 A1 * | 8/2008 | Breed | G01S 7/417 |
| | | | 702/41 |
| 2008/0234899 A1 * | 9/2008 | Breed | B60N 2/002 |
| | | | 701/47 |
| 2009/0003975 A1 * | 1/2009 | Kuduvalli | A61N 5/1049 |
| | | | 414/146 |
| 2009/0046538 A1 * | 2/2009 | Breed | B60C 11/24 |
| | | | 367/93 |
| 2009/0066065 A1 * | 3/2009 | Breed | B60J 10/00 |
| | | | 280/735 |
| 2009/0132099 A1 * | 5/2009 | Kriger | G01G 19/4142 |
| | | | 701/1 |
| 2009/0137952 A1 * | 5/2009 | Ramamurthy | A61B 5/06 |
| | | | 604/95.01 |
| 2010/0108425 A1 * | 5/2010 | Crespo | A61B 5/082 |
| | | | 180/272 |
| 2010/0174407 A1 * | 7/2010 | Fukawa | B23K 26/04 |
| | | | 700/245 |
| 2010/0222939 A1 * | 9/2010 | Namburu | G07C 9/00111 |
| | | | 701/2 |
| 2010/0305757 A1 * | 12/2010 | Sonner | B23K 26/02 |
| | | | 700/262 |
| 2012/0001463 A1 * | 1/2012 | Breed | B60J 10/00 |
| | | | 297/217.2 |

FOREIGN PATENT DOCUMENTS

| | | |
|---|---|---|
| DE | 103 44 526 A1 | 4/2005 |
| DE | 10 2004 011 769 B3 | 8/2005 |
| DE | 10 2004 038 310 A1 | 2/2006 |
| DE | 10 2005 033 605 A1 | 1/2007 |
| DE | 20 2007 018 689 U1 | 3/2009 |
| EP | 1 716 963 A1 | 11/2006 |
| EP | 1 826 643 A1 | 8/2007 |
| EP | 1 568 436 B1 | 9/2007 |

* cited by examiner $e_{ist} = e_{actual}$
$f_{ist} = f_{actual}$

METHOD AND DEVICE FOR CONTROLLING AN AUXILIARY TOOL AXIS OF A TOOL BEING GUIDED BY A MANIPULATOR

The present invention relates to a method and a device for operating an additional tool axis of a tool which is guided by a manipulator, in particular a robot.

It is known for example from U.S. Pat. No. 6,787,729 B2 to guide a tool in the form of a welding tongs by means of a six-axis industrial robot. This enables the tool to be brought into any desired position and orientation in cartesian space—within the framework of the operating range of the robot. An additional linear tool axis makes it possible to close the welding tongs. U.S. Pat. No. 6,787,729 B2 proposes to integrate the controlling of the linear tool axis into a control device of the robot, which also controls the manipulator axes.

It is known from DE 10 2004 011 769 B3 to use a six-axis industrial robot to guide a remote laser head whose focal length is adjustable by means of a movable linear unit. A program is stored in the control device of the robot which guides the laser beam by moving the manual axes of the robot. DE 20 2007 018 689 U1 also proposes to modify a laser optics system, by moving an axis of a robot in order to correct a focus position of a laser.

To date, the actuation of additional tool axes by the control device of a manipulator has generally been accomplished by first defining target axis positions of the tool axis, for example a position of a linear drive or an angular position of a servo motor. This can be done for example online through so-called teaching, or offline in the form of an editable program code. The defined target axis positions are saved. When a working program saved in this manner is executed, the control device reads in the saved target axis positions and addresses an actuator, for example a linear drive or servo motor, in conformity with these target axis positions.

This procedure has a number of disadvantages, which can be illustrated using the example of remote laser welding. On the one hand, the focal length of the focusing optics of a laser head depends on the wavelength of the laser being used. Now if a weaker pilot laser is used for teaching or testing a working program, whose wavelength differs from that of the process laser employed in the working operation, then different target positions for the drive of the focusing optics system are required for focusing the pilot laser on a workpiece than for focusing the process laser. On the other hand, the focal length of a focusing optics system depends in a highly non-linear manner on the axis position of the focusing optics. So if the focal length is to be increased for example by 10 mm in order to follow an offset in the workpiece being welded, these 10 mm cannot simply be converted proportionally into a corresponding target axis position, further complicating in particular offline programming of the particular target axis positions that achieve the desired focal length.

With today's control devices, which provide for direct defining of target axis positions, to which the unit is then moved while allowing for offset and translation of the tool, it is therefore not yet possible to control arbitrary tool axes optimally, in particular tool axes that are related in a non-linear way to the axis position or other tool parameters such as the wavelength of a laser.

The object of the present invention is therefore to improve the operation of an additional tool axis of a tool guided by a manipulator.

The invention proposes automatic conversion of position values of a tool axis of a tool guided by a manipulator, and of axis positions of the tool axis that achieve these position values. Such an automatic conversion may for example take account of the wavelength of a laser or of a non-linear connection between the focal length and the axis position, and may thus enable advantageous teaching of robot-guided remote laser heads. In this way, according to one aspect of the present invention, process-based and graphic position values may be used in a working or computer program, which simplifies the programming, since the user can now directly define or edit the position values, for example the focal length. According to another aspect of the present invention, conversely, axis positions of the tool axis can be displayed as position values in a process-based and graphic manner. For example, during a review of a taught path the axis position just occupied by a focusing optics unit can be converted into a focal length, which is displayed to the user.

A manipulator generally has one or more manipulator axes, preferably at least six axes, for example the axes of rotation of an articulated arm robot or SCARA robot or the linear axes of a portal robot. By specifying axis positions of these manipulator axes, it is possible to bring a tool guided by the manipulator into a desired position and/or orientation in space. The position can be specified for example by cartesian coordinates relative to a reference system, the orientation for example by Euler or cardan angles relative to the reference system. The terms position of an axis or axis position are used in particular to designate the angular position around an axis of rotation or the displacement along a translational axis, i.e., the values of the coordinates that describe the degree of freedom of the axis of motion. The axis positions of the manipulator axes are reproduced by the forward kinematics of the manipulator to the position and orientation of the tool.

The tool guided by the manipulator, on the other hand, has at least one additional tool axis, for example the axis of a linear drive or servo motor, with which the focusing optics system of a laser head can be adjusted. This additional tool axis determines, preferably independently or decoupled from the manipulator axes, a position value of the tool, for example the focal length of a laser head or its distance from its focal point.

According to one aspect of the present invention, this position value is converted automatically into an axis position that brings it about, and thus is defined; in particular, it is saved in a computer program. In this way the position value itself, for example the desired cartesian distance of a laser focal point from a laser head, can be specified in a simple manner, perhaps by inputting an appropriate value during teaching, for example by means of a manual device, or by editing a taught or offline-programmed working program of the control device. According to another aspect of the present invention, additionally or alternatively the axis position of the tool axis is converted automatically into the position value that brings it about, and the latter is displayed. In this way the position value, for example the cartesian distance of a laser focal point from a laser head, can be displayed in a graphic and process-specific manner, thus simplifying the reviewing of a working program.

In a preferred embodiment of the present invention, the conversion of the position value and of the axis position that brings it about is performed in a control device of the manipulator. To this end, one or more conversion devices may be implemented in the control device by means of hardware and/or software. In one preferred embodiment, such a conversion device may be activated automatically or manually when a corresponding tool is connected. In this way, tool axes of various tools can be selected through the optional activation of various conversion devices or various operating modes of a conversion device.

Preferably, the conversion of the position value and of the axis position that brings it about is performed during the operation of the manipulator, so that the more graphic and process-based position values can be used, in particular saved and/or displayed, when creating, modifying or testing a working program.

The invention is especially advantageous when the position value does not depend linearly on the axis position that brings it about, as is the case for example with the focusing optics system of a manipulator-guided laser head.

The conversion of the position value into the axis position of the tool axis that brings it about may also depend on one or more tool parameters, as is the case for example with the wavelength-dependent focal length of a focusing optics system. In this case, changes in the axis position and the position value differ from each other, so that in particular a desired change of the position value can be specified process-specifically and intuitively, or an actual change of the axis position that occurs can be displayed process-specifically and intuitively.

In particular, if the position value is converted in the control device of the manipulator to the axis position that brings it about, this axis position of the tool axis can be monitored in the control device. To this end, it is possible to monitor for example whether the axis position of the tool axis falls within a specified range or overruns software limit switches inadmissibly, and/or whether the change in the axis position over time, in particular an axis velocity or acceleration of the tool axis, falls within a specified range or exceeds specified maximum values. Preferably, this enables axis monitoring processes that are already present in the control device to be retained unchanged.

In a preferred embodiment, the conversion depends on one or more tool parameters. These can be defined for example by the user. For example, the user can select whether a pilot laser or a process laser is guided by the manipulator. The conversion then takes place on the basis of the wavelength, and thus on the basis of the non-linear relationship between the axis position of the focusing optics of the focal distance. In the same way, the guided tool can also be recognized automatically and a corresponding conversion can be selected.

In a preferred embodiment, the position value or the axis position of the tool axis that brings it about is defined, saved and/or displayed. This increases the flexibility of the present invention. For example, in one embodiment a user can select whether the axis value, i.e., the position of a focusing optics system, is displayed directly, or whether the focal length found thereby is displayed. In another preferred embodiment, in order to generate computer programs that can also be run by control devices that are not in accordance with the invention, which can only process axis values themselves, the axis position of the tool axis can also be specified, in particular saved.

Figure 2:
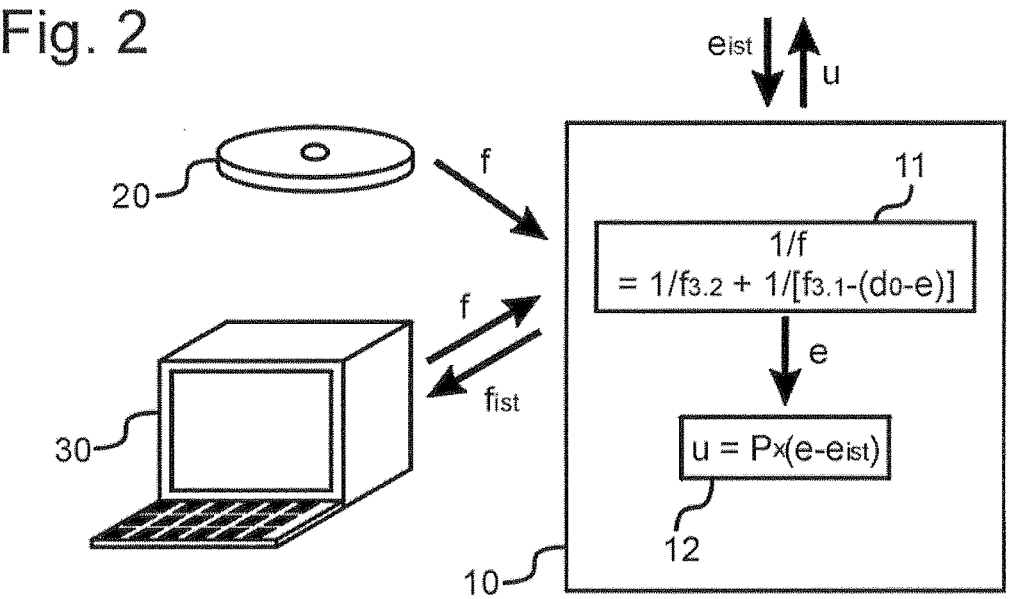

Additional advantages and features result from the subordinate claims and the exemplary embodiments. To this end the drawing shows the following, partially in schematic form:

FIG. 1: a robot during laser processing according to one version of the present invention, and FIG. 2: the process of a method according to the invention.

FIG. 1 shows a six-axis articulated-arm robot 1, whose drive motors (indicated in black) rotate a carousel by a rotational angle q1 relative to a base frame, rotate a rocker arm by a rotational angle q2 relative to the carousel, rotate an arm by a rotational angle q3 relative to the rocker arm and a central hand by a rotational angle q4 to q6 relative to the arm around paired orthogonal hand axes that intersect each other at one point. These rotational angles or axis positions q1, . . . , q6 of the six manipulator axes determine the position and orientation of a remote laser head 2 in space, in particular the cartesian coordinates of its exit aperture and the orientation of its optical axis.

Remote laser head 2 has a laser light source 3, which—in a variant not depicted—can also be realized by coupling laser light from a separate laser light source, in particular one that is stationary, by means of an optical conductor, for example a fiber-optic cable. To focus the laser light at a focal point F, for example to weld or cut a workpiece 4, remote laser head 2 has an adjustable focusing optics system, which is indicated in FIG. 1 by a stationary second lens 3.2 and a first lens 3.1 that can be moved relative to it. The focal length f, or the distance of focal point F from the principal plane of second lens 3.2, is dependent in a non-linear way on the tool parameter λ and the axis position e of tool axis Z, according to $$\frac{1}{f} = \frac{1}{f_{3.2}} + \frac{1}{f_{3.1} - d} \quad (1)$$

$$d = d_0 - e$$

$$f_{3.1} = f_{3.1}(\lambda)$$

$$f_{3.2} = f_{3.2}(\lambda)$$

with
  the focal length $f_{3,i}$ of the ith lens 3.1 or 3.2, which depends on the wavelength λ of the laser 3, and
  the distance d between the facing planes of the two lenses 3.1, 3.2, which results from the zero position $d_0$ of the first lens relative to the second lens and the axis position e along the tool axis Z of the laser head 2.

For focusing, the axis position e of the first lens 3.1, i.e., its position on the optical axis Z, can be shifted by means of a linear or actuator drive 2.1 of tool 2.

For teaching, laser head 2 is fitted with a pilot laser 3 and placed in a desired position and orientation above workpiece 4. Then the focal length f is specified as a position value, for example by means of an input device 30 or by editing a working program, in such a way that the focal point F lies on the surface of the workpiece. This position value is saved on a data medium 20, for example in a working program or in a file called by the latter.

A control device 10, which on the one hand controls the six manipulator axes of robot 1 and on the other hand controls the tool axis Z of laser head 2, and to that end obtains from drive 2.1 the latter's present axis position $e_{actual}$ and outputs to it a setting value u, for example a target current value, has a converting device 11 and a tool axis control unit 12. To this end, control device 10 has an interface which manages conversion functions implemented by converting device 11 for the tool axis Z and other possible additional tool axes.

Converting device 11 is activated for tool axis Z, or a corresponding operating mode is activated, for example through input from the user or through recognition of remote laser head 2 as a connected tool. To that end, a configuration file in which the functional relationship (1) is stored is read in. An appropriate value for the wavelength λ, is set, depending on whether a pilot laser or a process laser is being guided by robot 1.

During execution of the working program stored on data medium 20, control device 10 receives the specified position value $f_{target}$ for the focal length to be set. From this value, converting device 11, using (1) and the corresponding value for the wavelength λ, determines an axis position e for tool axis Z, i.e., a target position of first lens 3.1 or of drive 2.1. This target axis position is converted in tool axis control unit 12 to a control command u for drive 2.1 of laser head 2, which is indicated in FIG. 2 by a simple proportional controller.

That enables graphic, intuitively understandable and process-based position values to be specified, saved and edited in the working program in the form of the desired focal length f. The control device converts these position values, which are independent of the laser in use, in accordance with the wavelength of the laser being utilized and the non-linear characteristic of the focusing optics system, into appropriate axis positions e and implements these. For example, if the actual process laser is now used instead of the pilot laser, converting device 11 converts the saved target position values of the tool, i.e., the focal length f of laser head 2, with the focal lengths $f_{3,i}(\lambda_{process\ laser})$, and thus despite the difference it focuses with the pilot laser on workpiece 4 for the purpose of teaching.

Additionally or alternatively, it is also possible, as indicated in FIG. 3, to convert a present axis position $e_{actual}$ of drive 2.1 according to (1) into a focal length $f_{actual}$ that is set thereby and to display it on input device 30. Preferably, the user can choose here whether the axis position $e_{actual}$ or the position value $f_{actual}$ is displayed.

REFERENCE LABELS

1 robot
2 tool (laser head)
2.1 drive
3 laser (pilot or process laser)
3.1 first (movable) lens
3.2 second (stationary) lens
4 workpiece
10 control device
11 converting device
12 tool axis control unit
20 data medium
30 input device
d distance between the primary planes of the lenses 3.1, 3.2
e axis position (displacement of lens 3.1 along Z)
f position value (focal length)
F focal point
q1-q6 manipulator axes
Z tool axis

The invention claimed is:

1. A method of operating an independently actuable axis of a tool supported on a robotic manipulator having a plurality of drive axes controlled by a computer control, the method comprising:
    defining a position and/or orientation of the tool in space in terms of the translational or angular positions of the drive axes of the robotic manipulator;
    defining a process-based position value of a target along the tool axis; and
    determining a tool drive axis position that results in the process-based position value using the computer control.

2. The method of claim 1, wherein the determination of the tool drive axis position is carried out while the robotic manipulator is operating.

3. The method of claim 1, wherein the process-based position value is dependent in a non-linear manner on the tool drive axis position.

4. The method of claim 1, wherein the process-based position value is independent of the translational or angular positions of drive axes of the robotic manipulator.

5. The method of claim 1, wherein the process-based position value is a distance to a working point, expressed in Cartesian coordinates.

6. The method of claim 1, wherein the process-based position value is related to an angular orientation of the tool axis.

7. The method of claim 1, wherein the tool drive axis position is a function of a predetermined tool parameter.

8. The method of claim 7, wherein the computer control automatically detects the tool parameter.

9. The method of claim 7, wherein the tool is an adjustable focusing optics system and the tool parameter is a focal length of the adjustable focusing optics system.

10. The method of claim 7, wherein the tool is a laser and the tool parameter is a wavelength of the laser.

11. A method of operating an independently actuable axis of a tool supported on a robotic manipulator having a plurality of drive axes controlled by a computer control, the method comprising:
    defining a position and/or orientation of the tool in space in terms of the translational or angular positions of the drive axes of the robotic manipulator;
    defining a process-based position value of a target along the tool axis;
    determining a tool drive axis position that results in the process-based position value using the computer control; and
    operating the tool drive axis independently of the drive axes of the robotic manipulator to translate a component of the tool toward or away from the target.

* * * * *

UNITED STATES PATENT AND TRADEMARK OFFICE
CERTIFICATE OF CORRECTION

Page 1 of 1

PATENT NO. : 9,616,526 B2
APPLICATION NO. : 12/787625
DATED : April 11, 2017
INVENTOR(S) : Christian Sonner et al.

It is certified that error appears in the above-identified patent and that said Letters Patent is hereby corrected as shown below:

On the Title Page

Column 2, References Cited, U.S. Patent Documents, omitted the following documents:
2003/0209893    Breed, David S.
2004/0010328    Carson, Barry R.
2009/0046538    Breed, David S.
2009/0066065    Breed, David S.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*